(12) United States Patent
Nishimura

(10) Patent No.: US 10,787,197 B2
(45) Date of Patent: Sep. 29, 2020

(54) STEERING CONTROL APPARATUS

(71) Applicant: JTEKT CORPORATION, Osaka-shi, Osaka (JP)

(72) Inventor: Akihiko Nishimura, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/037,816

(22) Filed: Jul. 17, 2018

(65) Prior Publication Data
US 2019/0023311 A1    Jan. 24, 2019

(30) Foreign Application Priority Data
Jul. 24, 2017 (JP) ................. 2017-142983

(51) Int. Cl.
*B62D 5/04* (2006.01)
(52) U.S. Cl.
CPC ......... *B62D 5/0463* (2013.01); *B62D 5/0472* (2013.01); *B62D 5/0424* (2013.01)
(58) Field of Classification Search
CPC ...... G10K 11/00; G10K 15/00; B62D 5/0463; B62D 5/0472; B62D 5/0424; B62D 5/04; B62D 6/00; G01C 23/00; B60W 50/06; B60W 2300/00; B60W 2400/00
USPC .......................................................... 701/3
See application file for complete search history.

(56) References Cited

U.S. PATENT DOCUMENTS

| | | | | |
|---|---|---|---|---|
| 4,951,199 A * | 8/1990 | Whitehead | ........... | B62D 5/0466 180/446 |
| 9,457,837 B2 * | 10/2016 | Kudo | ................ | B62D 5/0472 |
| 2005/0247510 A1 * | 11/2005 | Asano | .................. | B60T 8/1755 180/421 |
| 2007/0029129 A1 * | 2/2007 | Shiozawa | ............ | B62D 5/0472 180/446 |
| 2008/0189014 A1 * | 8/2008 | Tanaka | ................. | B62D 5/0466 701/42 |
| 2009/0095564 A1 * | 4/2009 | Tashiro | ................ | B62D 5/0472 180/443 |

(Continued)

FOREIGN PATENT DOCUMENTS

| | | |
|---|---|---|
| JP | 2008-006997 A | 1/2008 |
| JP | 2009-133680 A | 6/2009 |
| JP | 2011-057214 A | 3/2011 |

OTHER PUBLICATIONS

Jan. 4, 2019 Search Report issued in European Patent Application No. 18185067.8.

*Primary Examiner* — Shardul D Patel
(74) *Attorney, Agent, or Firm* — Oliff PLC

(57) ABSTRACT

A steering control apparatus includes a microcomputer configured to control driving of a motor based on a steering torque so as to generate, for a steering mechanism, an assist force as power for turning front wheels. The microcomputer calculates an assist component indicating the assist force to be generated in the motor based on the steering torque, acquires steered moments about axes extending in a vertical direction of the front wheels from hub units that rotatably support the front wheels and include front wheel sensors configured to detect forces applied to the front wheels, respectively, and compensates for the assist component by using the acquired steered moments so as to generate, in the motor, a vibration suppressing force for suppressing a reverse input vibration.

5 Claims, 6 Drawing Sheets

(56) References Cited

U.S. PATENT DOCUMENTS

| | | | |
|---|---|---|---|
| 2009/0114470 A1* | 5/2009 | Shimizu | B62D 1/16 180/444 |
| 2009/0240389 A1* | 9/2009 | Nomura | B62D 5/046 701/31.4 |
| 2012/0271513 A1* | 10/2012 | Yoneda | B62D 5/0484 701/41 |
| 2013/0073146 A1* | 3/2013 | Konomi | B62D 6/008 701/41 |
| 2013/0211677 A1* | 8/2013 | Oblizajek | B62D 5/0472 701/42 |
| 2014/0297122 A1* | 10/2014 | Kouchi | B62D 6/04 701/41 |
| 2014/0343794 A1 | 11/2014 | Tamaizumi et al. | |
| 2015/0066306 A1* | 3/2015 | Kodera | B62D 5/0466 701/43 |
| 2015/0251691 A1 | 9/2015 | Tamaizumi et al. | |
| 2015/0291210 A1 | 10/2015 | Kageyama | |
| 2015/0360715 A1* | 12/2015 | Shimizu | B62D 5/001 701/43 |
| 2016/0280252 A1* | 9/2016 | Tagami | B62D 5/046 |
| 2017/0001660 A1* | 1/2017 | Chiba | B62D 5/0472 |
| 2018/0043928 A1* | 2/2018 | Fujita | B62D 5/0463 |
| 2018/0086371 A1* | 3/2018 | Wang | B62D 5/0457 |
| 2018/0111642 A1* | 4/2018 | Endo | B62D 6/008 |
| 2019/0023311 A1* | 1/2019 | Nishimura | B62D 5/0463 |

\* cited by examiner

US 10,787,197 B2

STEERING CONTROL APPARATUS

INCORPORATION BY REFERENCE

The disclosure of Japanese Patent Application No. 2017-142983 filed on Jul. 24, 2017 including the specification, drawings and abstract, is incorporated herein by reference in its entirety.

BACKGROUND OF THE INVENTION

1. Field of the Invention

The present invention relates to a steering control apparatus.

2. Description of the Related Art

For example, Japanese Patent Application Publication No. 2008-6997 (JP 2008-6997 A) discloses an electric power steering system configured to apply a torque of a motor to a steering mechanism of a vehicle as an assist force. In a steering control apparatus of the electric power steering system, it is necessary to acquire various types of information on traveling of the vehicle in order to control driving of the motor. For example, a wheel speed is acquired through a bearing apparatus configured to rotatably support a steered wheel (wheel) of a vehicle as described in Japanese Patent Application Publication No. 2009-133680 (JP 2009-133680 A).

The bearing apparatus described in JP 2009-133680 A is provided with a sensor configured to detect a force applied to the wheel. Thus, a load applied to the wheel can be calculated in addition to the wheel speed. Specifically, in the bearing apparatus described in JP 2009-133680 A, a longitudinal horizontal direction of the wheel is defined as an x-axis direction, a lateral horizontal direction of the wheel is defined as a y-axis direction, and a vertical direction of the wheel is defined as a z-axis direction. A load in the x-axis direction, a load in the y-axis direction, a load in the z-axis direction, a moment load about the x-axis, and a moment load about the z-axis can be calculated in the bearing apparatus.

When the vehicle is provided with the bearing apparatus described in JP 2009-133680 A, the steering control apparatus can acquire various loads applied to the wheel as described above through the bearing apparatus in addition to the wheel speed. In this case, the steering control apparatus has room for proposal on a new method for using the information acquired from the bearing apparatus in addition to the wheel speed.

SUMMARY OF THE INVENTION

It is one object of the present invention to provide a steering control apparatus in which a new method for using information acquired from a bearing apparatus can be proposed.

A steering control apparatus according to one aspect of the present invention has the following features in its configuration. That is, the steering control apparatus includes a control unit configured to control driving of a motor that is a source of an assist force to be applied to a steering mechanism of a vehicle based on an operation condition amount changed through a driver's operation for the steering mechanism. The control unit is configured to calculate an assist component indicating the assist force to be generated in the motor based on the operation condition amount, acquire information on a moment load about an axis extending in a vertical direction of a steered wheel of the vehicle from a bearing apparatus that rotatably supports the steered wheel and includes a sensor configured to detect a force applied to the steered wheel, and compensate for the assist component by using the acquired information on the moment load so as to generate, in the motor, a vibration suppressing force for suppressing a vibration caused in the steering mechanism by the moment load of the steered wheel.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
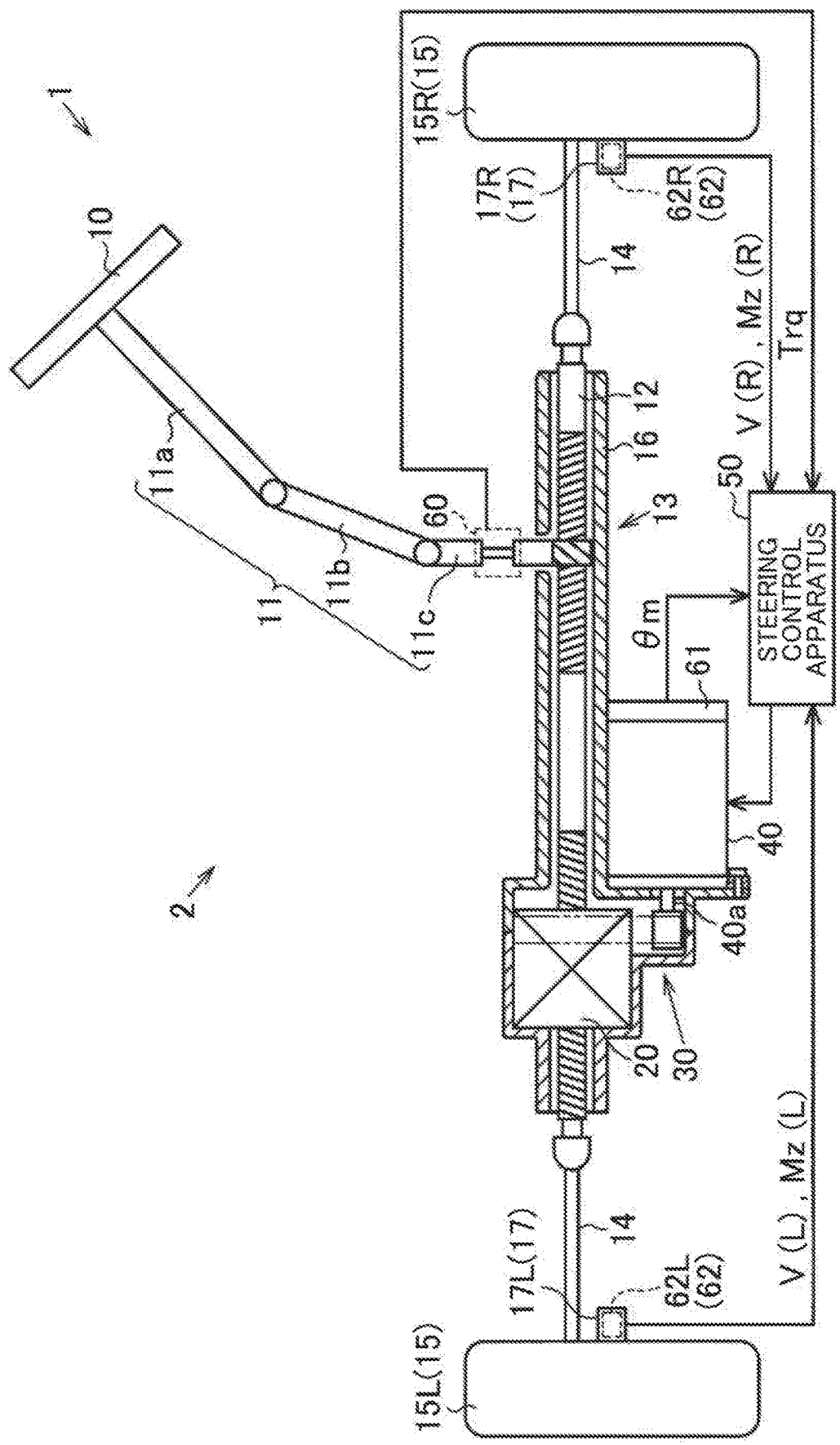
FIG. 1 is a diagram illustrating an overview of an electric power steering system mounted on a vehicle.

A steering control apparatus according to one embodiment is described below. As illustrated in FIG. 1, an electric power steering system 1 includes a steering mechanism 2 and a steering assist mechanism. The steering mechanism 2 turns steered wheels 15 (right front wheel 15R and left front wheel 15L in FIG. 1) that are a pair of right and left front wheels based on a driver's operation for a steering wheel 10. The steering assist mechanism assists the driver's steering operation.

The steering mechanism 2 includes the steering wheel 10 and a steering shaft 11. The steering shaft 11 is fixed to the steering wheel 10. The steering shaft 11 includes a column shaft 11a, an intermediate shaft 11b, and a pinion shaft 11c. The column shaft 11a is coupled to the steering wheel 10. The intermediate shaft 11b is coupled to the lower end of the column shaft 11a. The pinion shaft 11c is coupled to the lower end of the intermediate shaft 11b. The lower end of the pinion shaft 11c is coupled to a rack shaft 12 serving as a steering operation shaft via a rack and pinion mechanism 13. The rack shaft 12 is supported on a rack housing 16. The front wheels 15R and 15L are coupled to both ends of the rack shaft 12 via tie rods 14, respectively. Thus, rotational motion of the steering wheel 10, that is, the steering shaft 11 is converted to reciprocating linear motion of the rack shaft 12 in its axial direction (lateral direction in FIG. 1) via the rack and pinion mechanism 13 constituted by the pinion shaft 11c and the rack shaft 12. The reciprocating linear motion is transmitted to the front wheels 15R and 15L via the tie rods 14 coupled to both ends of the rack shaft 12, respectively. Thus, the steered angles of the front wheels 15R and 15L are changed.

A motor 40 is provided on the periphery of the rack shaft 12 as a component of the steering assist mechanism. The motor 40 is a source of power (assist force) to be applied to the steering mechanism 2. For example, the motor 40 is a surface permanent magnet synchronous motor (SPMSM), and is a three-phase brushless motor configured to rotate based on three-phase (U, V, W) driving electric power. The motor 40 is externally attached to the rack housing 16. A ball screw mechanism 20 and a belt type speed reducing mechanism 30 are provided inside the rack housing 16 as components of the steering assist mechanism. The ball screw mechanism 20 is integrally attached to the periphery of the rack shaft 12. The belt type speed reducing mechanism 30 transmits a rotational force of an output shaft 40a of the motor 40 to the ball screw mechanism 20. The rotational force of the output shaft 40a of the motor 40 is converted to a force for causing the rack shaft 12 to perform reciprocating linear motion in the axial direction via the speed reducing mechanism 30 and the ball screw mechanism 20. The axial force applied to the rack shaft 12 serves as power to change the steered angles of the right and left steered wheels 15.

As illustrated in FIG. 1, a steering control apparatus 50 is connected to the motor 40. The steering control apparatus 50 controls driving of the motor 40. The steering control apparatus 50 controls the driving of the motor 40 by controlling the supply of a current based on detection results from various sensors. The current is a control amount of the motor 40. Examples of various sensors include a torque sensor 60, a rotation angle sensor 61, and hub unit sensors 62 (right front wheel sensor 62R and left front wheel sensor 62L in FIG. 1). The torque sensor 60 is provided on the pinion shaft 11c. The rotation angle sensor 61 is provided on the motor 40. The right front wheel sensor 62R is provided on a right front hub unit 17R. The left front wheel sensor 62L is provided on a left front hub unit 17L. The torque sensor 60 detects a steering torque Trq that is an operation condition amount generated in the steering shaft 11 along with a change through the driver's steering operation. The rotation angle sensor 61 detects a rotation angle θm of the output shaft 40a of the motor 40. The right front wheel sensor 62R detects a wheel speed that is a rotation speed of the right front wheel 15R, and also detects a force applied to the right front wheel 15R as a force generated between a road surface and the right front wheel 15R. The left front wheel sensor 62L detects a wheel speed that is a rotation speed of the left front wheel 15L, and also detects a force applied to the left front wheel 15L as a force generated between the road surface and the left front wheel 15L.

The front wheel sensors 62R and 62L are described in detail. As illustrated in FIG. 1, the hub unit sensor 62 is built in a hub unit 17 serving as a bearing apparatus that supports the steered wheel 15 so that the steered wheel 15 is rotatable relative to a vehicle body together with a drive shaft (not illustrated) configured to transmit power of an on-board internal combustion engine. More specifically, the right front wheel sensor 62R is built in the right front hub unit 17R that supports the right front wheel 15R. The left front wheel sensor 62L is built in the left front hub unit 17L that supports the left front wheel 15L. That is, the hub units 17R and 17L of the present embodiment are hub units with sensor functions, which can directly detect the forces applied to the front wheels 15R and 15L, respectively, as the forces generated between the road surface and the front wheels 15R and 15L. In the present embodiment, the front wheel sensors 62R and 62L are provided at positions closer to the road surface or a tire tread area among various sensors mounted on the vehicle.

Figure 2:
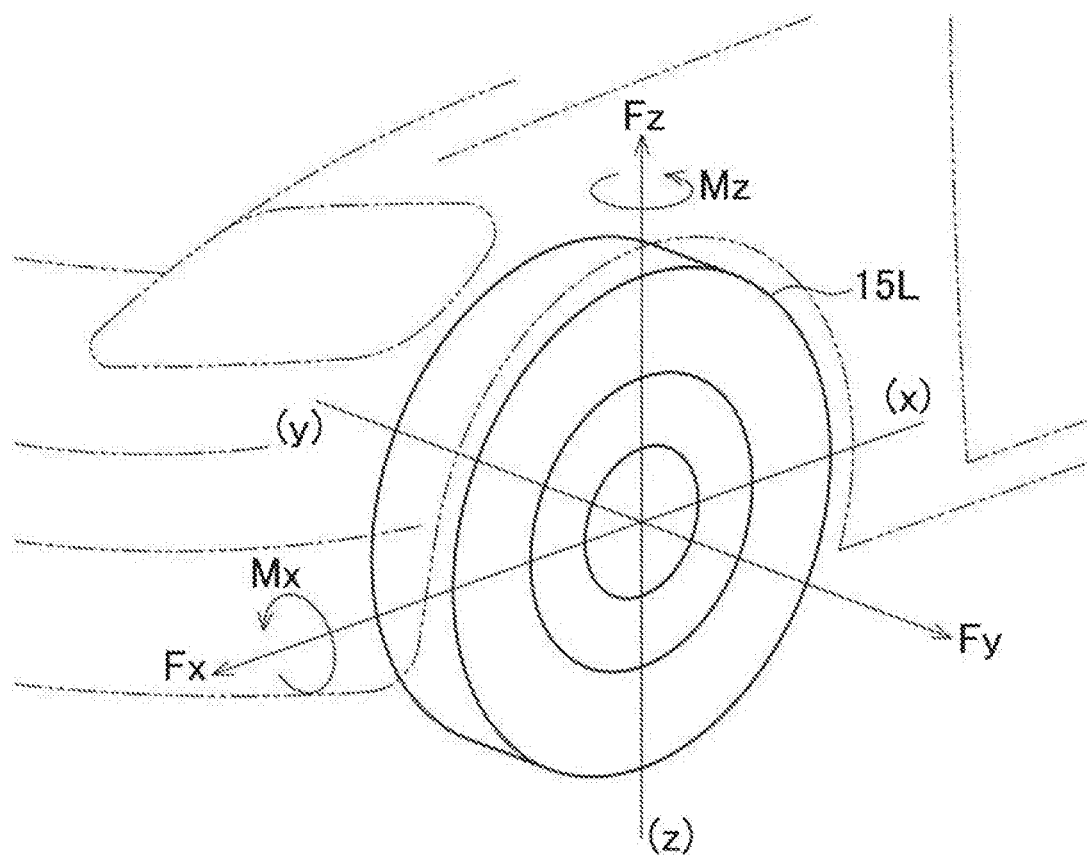
FIG. 2 is an explanatory diagram of specifications of a hub unit that implements a bearing apparatus mounted on the vehicle.

FIG. 2 illustrates a longitudinal horizontal direction of the left front wheel 15L as an x-axis direction, a lateral horizontal direction of the left front wheel 15L as a y-axis direction, and a vertical direction of the left front wheel 15L as a z-axis direction. The left front wheel sensor 62L calculates a load Fx in the x-axis direction, a load Fy in the y-axis direction, a load Fz in the z-axis direction, a moment load Mx about the x-axis, and a moment load Mz about the z-axis based on forces applied to the left front wheel 15L. The same applies to the right front wheel sensor 62R. Positive-negative directions of the various loads Fx, Fy, Fz, Mx, and Mz coincide with each other between the front wheel sensors 62R and 62L. The various loads Fx, Fy, Fz, Mx, and Mz (unit: newton (N)) are components that change depending on traveling conditions such as the vehicle speed and contain the vehicle speed or other elements.

In the present embodiment, the left front wheel sensor 62L outputs a left front wheel speed V(L) and a left front steered moment Mz(L) (unit: newton meter (N·m)) to the steering control apparatus 50. The left front wheel speed V(L) is information indicating the wheel speed detected in the left front wheel 15L. The left front steered moment Mz(L) is information on the moment load Mz about the z-axis that is detected in the left front wheel 15L. Similarly, the right front wheel sensor 62R outputs a right front wheel speed V(R) and a right front steered moment Mz(R) (unit: newton meter (N·m)) to the steering control apparatus 50. The right front wheel speed V(R) is information indicating the wheel speed detected in the right front wheel 15R. The right front steered moment Mz(R) is information on the moment load Mz about the z-axis that is detected in the right front wheel 15R.

Figure 3:
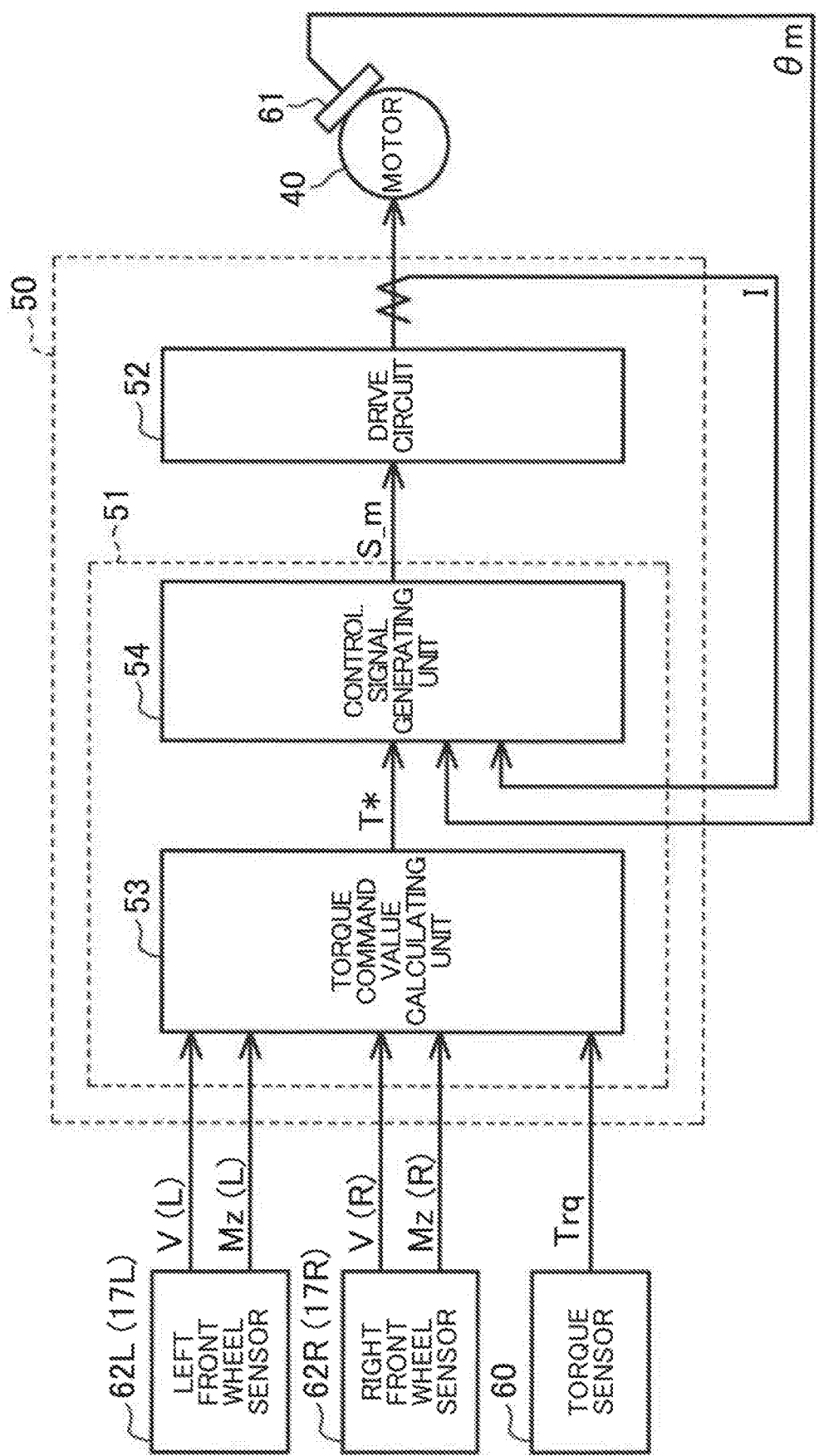
FIG. 3 is a block diagram illustrating the electric configuration of the electric power steering system.

Next, the electric configuration of the electric power steering system 1 is described. As illustrated in FIG. 3, the steering control apparatus 50 includes a microcomputer 51 and a drive circuit 52. The microcomputer 51 generates a motor control signal S_m. The drive circuit 52 supplies a current to the motor 40 based on the motor control signal S_m. The microcomputer 51 acquires detection results from the torque sensor 60, the rotation angle sensor 61, the right front wheel sensor 62R (right front hub unit 17R), and the left front wheel sensor 62L (left front hub unit 17L) and an actual current I of the motor 40. The microcomputer 51 generates the motor control signal S_m, and outputs the motor control signal S_m to the drive circuit 52 as a pulse width modulation (PWM) signal. In the present embodiment, the microcomputer 51 is an example of a control unit.

Next, functions of the microcomputer 51 are described in detail. The microcomputer 51 includes a central processing unit (CPU) (not illustrated) and a memory (not illustrated). The CPU executes a program stored in the memory, thereby controlling the driving of the motor 40.

FIG. 3 illustrates a part of processing to be executed by the microcomputer 51. The processing illustrated in FIG. 3 is a part of the processing that is implemented by the CPU executing the program stored in the memory and is described based on the types of the implemented processing.

The microcomputer 51 includes a torque command value calculating unit 53 and a control signal generating unit 54. The steering torque Trq, the wheel speeds V(R) and V(L), and the steered moments Mz(R) and Mz(L) are input to the torque command value calculating unit 53. The torque command value calculating unit 53 calculates a torque command value T* based on the steering torque Trq, the wheel speeds V(R) and V(L), and the steered moments Mz(R) and Mz(L). The torque command value T* is a target value of a current amount corresponding to an assist force to be generated in the motor 40.

The torque command value T* calculated by the torque command value calculating unit 53, the rotation angle θm, and the actual current I are input to the control signal generating unit 54. The control signal generating unit 54 generates the motor control signal S_m based on the torque command value T*, the rotation angle θm, and the actual current I, and outputs the motor control signal S_m to the drive circuit 52 as the PWM signal.

Figure 4:
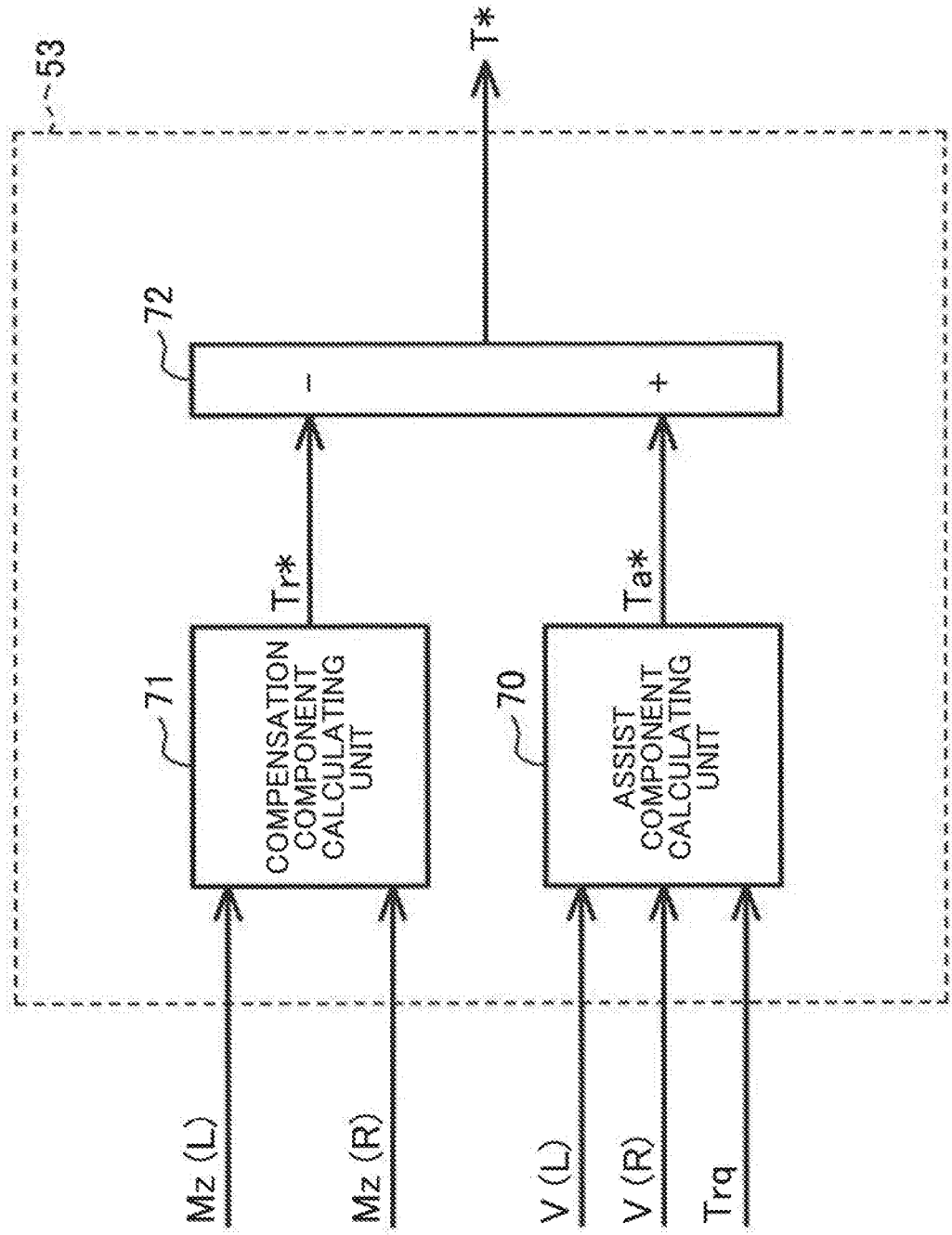
FIG. 4 is a block diagram illustrating functions of a torque command value calculating unit of the electric power steering system.

Functions of the torque command value calculating unit 53 are described in more detail. As illustrated in FIG. 4, the torque command value calculating unit 53 includes an assist component calculating unit 70 and a compensation component calculating unit 71. The assist component calculating unit 70 calculates (generates) an assist component Ta*. The compensation component calculating unit 71 calculates (generates) a compensation component Tr*. The torque command value calculating unit 53 includes a subtraction processing unit 72 configured to calculate (generate) the torque command value T* obtained by subtracting the compensation component Tr* generated by the compensation component calculating unit 71 from the assist component Ta* generated by the assist component calculating unit 70.

The steering torque Trq and the wheel speeds V(R) and V(L) are input to the assist component calculating unit 70. The assist component calculating unit 70 generates the assist component Ta* through calculation based on the steering torque Trq and the wheel speeds V(R) and V(L). The assist component Ta* indicates an assist force to be generated in the motor 40. The assist component calculating unit 70 uses any one wheel speed set in advance out of the wheel speeds V(R) and V(L), and determines the validity of the value of the wheel speed to be used based on, for example, calculation of a root mean square sum of the wheel speeds V(R) and V(L).

The steered moments Mz(R) and Mz(L) are input to the compensation component calculating unit 71. The compensation component calculating unit 71 generates the compensation component Tr* through calculation based on the steered moments Mz(R) and Mz(L). The compensation component Tr* is a component for compensating for the assist component Ta* so as to generate a vibration suppressing force in the motor 40. The vibration suppressing force suppresses a reverse input vibration that is a vibration (so-called shimmy) applied to the steering mechanism 2, in particular, the rack shaft 12 so as to deteriorate a steering feel. In the present embodiment, the reverse input vibration is a vibration caused when a brake of the vehicle is actuated and is a vibration applied so as to deteriorate the steering feel among the vibrations caused in the rack shaft 12 by the moment loads applied to the front wheels 15R and 15L.

Figure 5:
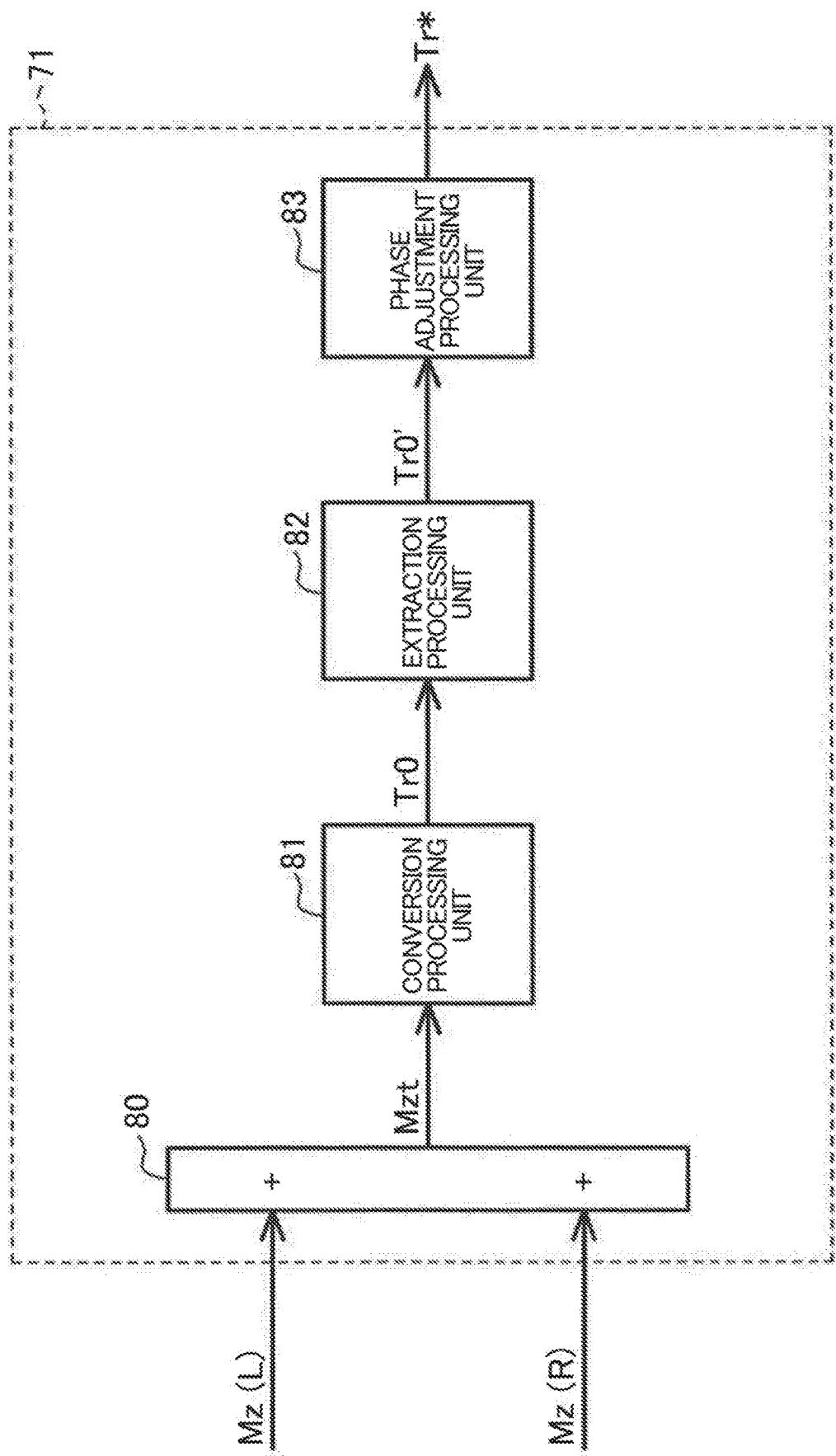
FIG. 5 is a block diagram illustrating functions of a compensation component calculating unit of the torque command value calculating unit.

Specifically, as illustrated in FIG. 5, the compensation component calculating unit 71 includes an addition processing unit 80 configured to calculate (generate) a combined steered moment Mzt obtained by adding the right front steered moment Mz(R) and the left front steered moment Mz(L) together. The right front steered moment Mz(R) is information on the moment load applied to the right front wheel 15R. The left front steered moment Mz(L) is information on the moment load applied to the left front wheel 15L. The addition processing unit 80 is configured to calculate a force component (reverse input component) that is a combination of the steered moments of the front wheels 15R and 15L and is exerted by the steered moments on the steering mechanism 2, that is, the rack shaft 12.

The compensation component calculating unit 71 includes a conversion processing unit 81 configured to convert the combined steered moment Mzt generated by the addition processing unit 80 to a reverse input torque Tr0 (unit: newton meter (N·m)) that is a force component about the output shaft 40a of the motor 40, that is, a torque component. The conversion processing unit 81 converts the steered moments Mz(R) and Mz(L) of the front wheels 15R and 15L to a force component in the axial direction, that is, an axial force of the rack shaft 12 by multiplying the combined steered moment Mzt by a primary conversion factor. The primary conversion factor is determined based on an operation ratio between an axial movement amount of the rack shaft 12 and steered amounts of the front wheels 15R and 15L. The conversion processing unit 81 further multiplies the axial force of the rack shaft 12 that is obtained through the conversion by a secondary conversion factor. Thus, the conversion processing unit 81 converts the axial force of the rack shaft 12 to the torque component about the output shaft 40a of the motor 40. The secondary conversion factor is determined based on a speed reducing ratio of the belt type speed reducing mechanism 30 and a lead of the ball screw mechanism 20.

The compensation component calculating unit 71 includes an extraction processing unit 82 configured to extract a reverse input vibration component Tr0' from the reverse input torque Tr0 obtained through the conversion processing performed by the conversion processing unit 81. The reverse input vibration component Tr0' is a specific frequency component that belongs to a predetermined frequency band serving as a basis for the compensation component Tr*. The extraction processing unit 82 extracts the reverse input vibration component Tr0' that belongs to a frequency band corresponding to a vibration caused when the brake of the vehicle is actuated. In the present embodiment, the extraction processing unit 82 is a band-pass filter configured to extract a frequency component that belongs to a predetermined frequency band of, for example, 15 to 20 hertz (Hz).

The compensation component calculating unit 71 includes a phase adjustment processing unit 83 configured to adjust a phase of the reverse input vibration component Tr0' obtained through the extraction processing performed by the extraction processing unit 82. In order to eliminate a shift amount α of the phase, the phase adjustment processing unit 83 adjusts the phase so that the phase is advanced by the shift amount α. Thus, the phase adjustment processing unit 83 generates the compensation component Tr* indicating the vibration suppressing force to be generated in the motor 40. The shift amount α is determined in advance through an experiment or the like, and is set in advance based on a delay caused by a mechanical tolerance between the motor 40 and the rack shaft 12, a delay of calculation in the microcomputer 51, or the like.

The compensation component Tr* generated through the processing performed by the compensation component calculating unit 71 is subtracted by the subtraction processing unit 72, and is therefore reflected in the torque command value T* as a component having an opposite phase, in which the phase is shifted by "180°".

During a period in which the driving of the motor 40 is controlled, the microcomputer 51 having the configuration described above causes the compensation component calculating unit 71 to repeatedly acquire the steered moments Mz(R) and Mz(L) in a predetermined cycle. The microcomputer 51 repeatedly generates the compensation component Tr* in a predetermined cycle based on the acquired steered moments Mz(R) and Mz(L). That is, during the period in which the driving of the motor 40 is controlled, the microcomputer 51 repeatedly executes, in a predetermined cycle, the processing for suppressing the reverse input vibration caused in the rack shaft 12 when the brake of the vehicle is actuated.

Actions and effects of the present embodiment are described below.

(1) According to the present embodiment, the microcomputer 51 can acquire the steered moments Mz(R) and Mz(L) through the hub units 17R and 17L that rotatably support the front wheels 15R and 15L and include the front wheel sensors 62R and 62L configured to detect the forces applied to the front wheels 15R and 15L, respectively. Pieces of information on the moment loads applied to the front wheels 15R and 15L when the brake of the vehicle is actuated can be acquired from the steered moments Mz(R) and Mz(L) acquired in this manner, respectively. It is possible to detect the reverse input vibration caused in the rack shaft 12 by the moment loads. Thus, the reverse input vibration can be detected at positions closer to the road surface or the tire tread area. When controlling the driving of the motor 40 so that an assist force is generated in the rack shaft 12, the microcomputer 51 can control the compensation for the assist component Ta* with a quick response so as to suppress a reverse input signal. Thus, the steering feel can be improved. Accordingly, it is possible to propose a new method for using the hub units 17R and 17L, which involves using the steered moments Mz(R) and Mz(L) acquired from the hub units 17R and 17L in order to compensate for the assist component Ta* so as to improve the steering feel.

(2) Specifically, in the microcomputer 51, the compensation component calculating unit 71 configured to calculate the compensation component Tr* includes the extraction processing unit 82 configured to extract the reverse input vibration component Tr0' from the reverse input torque Tr0 obtained as the torque component about the output shaft 40a of the motor 40 through the conversion processing based on the steered moments Mz(R) and Mz(L) of the front wheels 15R and 15L.

That is, according to the present embodiment, the vibration that needs to be suppressed and is applied so as to deteriorate the steering feel can be appropriately extracted from among the vibrations caused in the rack shaft 12 by the moment loads applied to the front wheels 15R and 15L. Thus, appropriate measures can be taken against the vibration applied so as to deteriorate the steering feel, and the steering feel can be improved more effectively.

(3) In the present embodiment, the compensation component calculating unit 71 includes the phase adjustment processing unit 83 configured to adjust the phase of the reverse input vibration component Tr0' so that the phase is advanced by the shift amount α in order to eliminate the shift amount α of the phase.

Even if the motor 40 generates a desired assist force, a delay may be caused by the mechanical tolerance between the motor 40 and the rack shaft 12, the delay of calculation in the microcomputer 51, or the like by the time when the assist force is actually transmitted to the rack shaft 12.

Figure 6A:
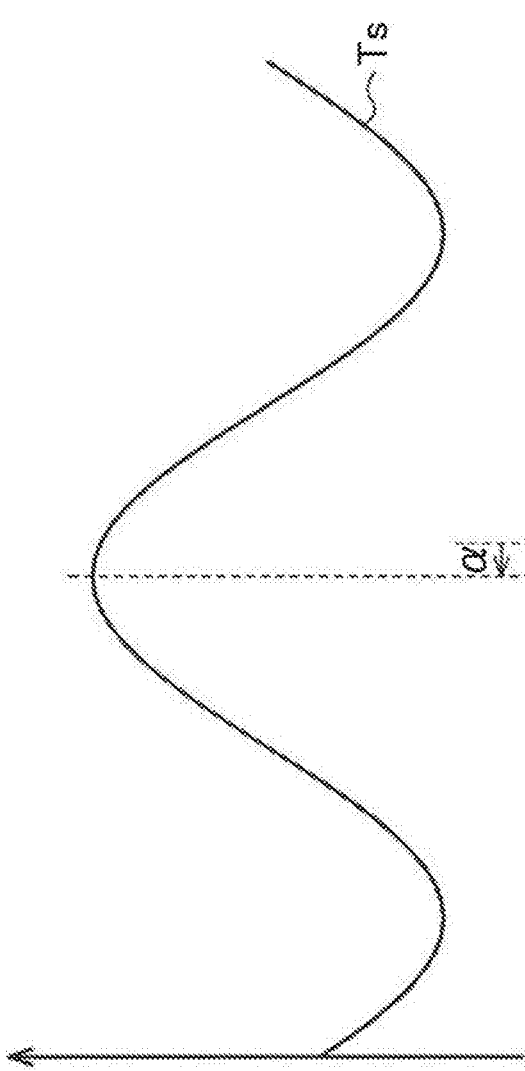
FIG. 6A and FIG. 6B are diagrams illustrating a reverse input vibration component actually generated in a steering mechanism of the electric power steering system and a compensation component in comparison with each other.
Figure 6B:
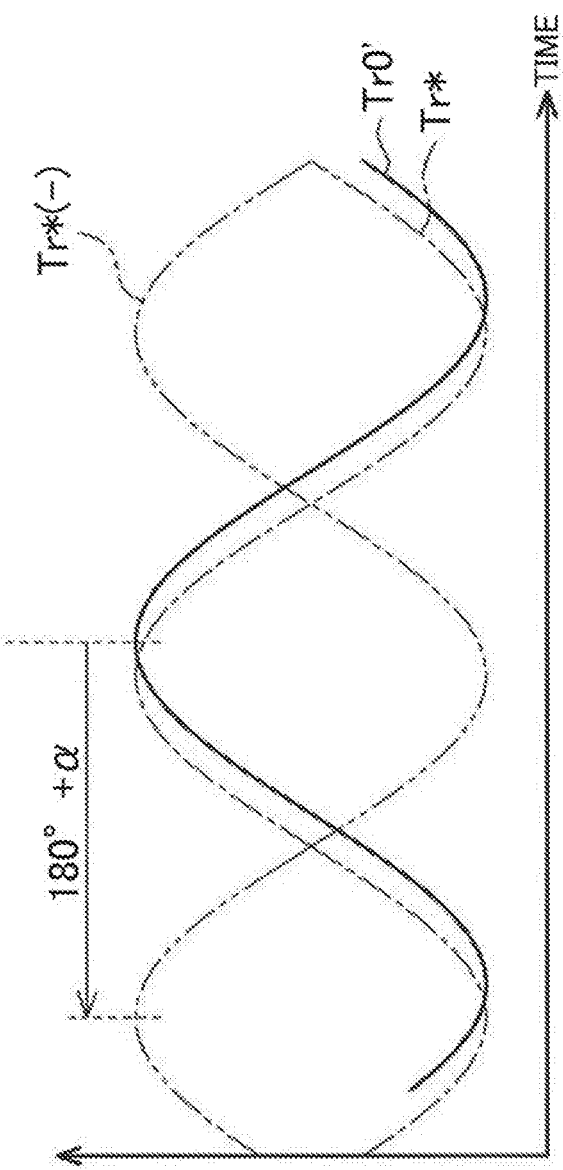

In this respect, according to the present embodiment, the phase adjustment processing unit 83 reduces influence of the vehicle in the reverse input vibration component Tr0' obtained through the extraction processing performed by the extraction processing unit 82. Specifically, as illustrated in FIG. 6A and FIG. 6B, the waveform of the reverse input vibration component Tr0' obtained through the extraction processing performed by the extraction processing unit 82 (indicated by a continuous line in FIG. 6B) has a phase delayed by the shift amount α (shifted rightward in FIG. 6B) as compared to the waveform of a reverse input vibration component Ts actually generated in the rack shaft 12. The waveform of the compensation component Tr* obtained by adjusting the phase of the reverse input vibration component Tr0' in the phase adjustment processing unit 83 (indicated by a long dashed short dashed line in FIG. 6B) has a phase advanced by the shift amount α (shifted leftward in FIG. 6B) as compared to the waveform of the reverse input vibration component Tr0'. The phase difference between the waveform of the compensation component Tr* and the waveform of the reverse input vibration component Ts actually generated in the rack shaft 12 is "0°". That is, the waveforms coincide with each other.

In this case, the microcomputer 51 determines the delay caused by the mechanical tolerance between the motor 40 and the rack shaft 12 within the range of transmission, the delay of calculation in the microcomputer 51, or the like as the shift amount α of the phase for each vehicle. Thus, the microcomputer 51 can compensate for the assist component Ta* so as to suppress the reverse input vibration. Accordingly, the steering feel can be improved.

(4) In the present embodiment, the compensation component Tr* is obtained by adjusting, in the phase adjustment processing unit 83, the phase of the reverse input vibration component Tr0' obtained through the extraction processing performed by the extraction processing unit 82, and is reflected in the torque command value T* as a component having an opposite phase, in which the phase is further shifted by "180°".

Specifically, as illustrated in FIG. 6B, the waveform of a compensation component Tr*(−) that is indicated by a long dashed double-short dashed line in FIG. 6B and is reflected in the torque command value T* has a phase shifted by "180°+α" from the waveform of the reverse input vibration component Tr0' indicated by the continuous line in FIG. 6B.

Thus, the compensation component Tr* can be applied so as to suppress the reverse input vibration actually caused in the rack shaft 12. In the case of the present embodiment, the phase is adjusted by the phase adjustment processing unit 83 as described above, and therefore the influence of the vehicle can be reduced as well. Thus, it is possible to compensate for the assist component Ta* more accurately so as to suppress the reverse input vibration.

(5) In the present embodiment, the vibration caused when the brake of the vehicle is actuated is assumed as the reverse input vibration. That is, in the present embodiment, the predetermined frequency band in which the extraction is performed by the extraction processing unit 82 is set to a frequency band (for example, 15 to 20 hertz (Hz)) that is determined as a frequency band of the vibration caused in the rack shaft 12 when the brake of the vehicle is actuated.

According to the present embodiment, appropriate measures can be taken against the vibration caused when the brake of the vehicle is actuated, thereby being able to cope with the cause of deterioration of the steering feel more accurately. Thus, it is possible to propose a method for using the hub units 17R and 17L in order to improve the steering feel more suitably.

(6) In the present embodiment, the compensation component calculating unit 71 includes the addition processing unit 80 configured to calculate (generate) the combined steered moment Mzt obtained by adding the steered moments Mz(R) and Mz(L) together.

Thus, when the steered moments Mz(R) and Mz(L) are acquired, the combined steered moment Mzt can be used in the calculation of the compensation component Tr*. Therefore, it is possible to calculate a component that is more appropriate as the compensation component Tr*. Thus, appropriate measures can be taken against the reverse input vibration, and the steering feel can be improved more effectively.

(7) In the present embodiment, the newly proposed method for using the hub units 17R and 17L can attain the microcomputer 51 capable of compensating for the assist component necessary to control the driving of the motor 40 configured to apply an assist force to the rack shaft 12 so as to improve the steering feel. In the electric power steering system 1 implemented by using the microcomputer 51 of the present embodiment, the steering feel can be improved more effectively in terms of the application of the assist force to the rack shaft 12.

The embodiment described above may be implemented as the following embodiments.

The extraction processing unit 82 may change the frequency component to be extracted, and extract a vibration other than the vibration caused when the brake of the vehicle is actuated. The extraction processing unit 82 may extract a wider variety of causal vibrations by extending the band of the frequency component to be extracted.

The phase adjustment processing unit 83 adjusts the phase so that the phase is advanced by the shift amount α. Along with this adjustment, the phase adjustment processing unit 83 adjusts the phase so as to obtain a component having an opposite phase, in which the phase is shifted by "180°". The phase adjustment processing unit 83 may generate the compensation component Tr*(−) having a waveform with a phase shift of "180°+α" from the waveform of the reverse input vibration component Tr0'. In this case, it is only necessary that the torque command value calculating unit 53 includes, in place of the subtraction processing unit 72, an addition processing unit configured to calculate (generate) the torque command value T* by adding the assist component Ta* and the compensation component Tr*(−) together.

The compensation component calculating unit 71 may be configured to calculate a gain to be used for multiplying the assist component Ta* based on the reverse input vibration component Tr0' extracted by the extraction processing unit 82. In this case, it is only necessary that the torque command value calculating unit 53 includes, in place of the subtraction processing unit 72, a multiplication processing unit configured to calculate (generate) the torque command value T* by multiplying the assist component Ta* by the gain generated by the compensation component calculating unit 71.

In the embodiment described above, the addition processing unit 80 may be omitted. The compensation component Tr* may be calculated (generated) based on the steered moments Mz(R) and Mz(L), and the steered moments Mz(R) and Mz(L) may be added together afterwards. Also in this case, effects similar to those of the embodiment described above can be attained.

In the embodiment described above, the phase adjustment processing unit 83 may be omitted. The reverse input vibration component Tr0' extracted by the extraction processing unit 82 may be used as the compensation component Tr*. Also in this case, the steering feel can be improved as compared to a case where the reverse input vibration is not suppressed.

In the compensation component calculating unit 71, the conversion processing unit 81 may be set as processing between the extraction processing unit 82 and the phase adjustment processing unit 83 or as processing subsequent to the phase adjustment processing unit 83. In any case, effects similar to those of the embodiment described above can be attained.

In the compensation component calculating unit 71, the conversion processing unit 81 may generate the compensation component Tr* based on the axial force obtained by converting the moment loads of the front wheels 15R and 15L about the z-axis direction to a force component in the axial direction of the rack shaft 12.

It is only necessary that the hub units 17R and 17L be configured to output at least the steered moments Mz(R) and Mz(L) based on the forces applied to the front wheels 15R and 15L, respectively. As long as this condition is satisfied, the front wheel sensors 62R and 62L of the hub units 17R and 17L may be any sensors such as an ultrasonic sensor, a magnetic sensor, or a contact sensor using a strain gauge, and do not require special specifications.

The hub units 17R and 17L may output the moment loads Mz applied to the front wheels 15R and 15L based on the forces applied to the front wheels 15R and 15L, respectively. In this case, the compensation component calculating unit 71 may directly convert the moment loads Mz applied to the front wheels 15R and 15L to the torque component, or may temporarily calculate the steered moments and then convert the steered moments to the torque component.

When the assist component calculating unit 70 calculates the assist component Ta*, the use of at least the steering torque Trq is only necessary, and the use of the wheel speeds V(R) and V(L) is not always necessary. When the assist component calculating unit 70 calculates the assist component Ta*, the steering torque Trq, the wheel speeds V(R) and V(L), and elements other than those elements may be used.

The embodiment described above is not limited to the rack assist type electric power steering system 1 in which the assist force is applied to the steering mechanism 2 by the motor 40 having the output shaft 40a arranged in parallel to the axis of the rack shaft 12. For example, the embodiment described above is also applicable to a column assist type or pinion assist type electric power steering system.

The modified examples described above may be applied in combination with each other. For example, the configuration in which the compensation component calculating unit 71 calculates a gain to be used for multiplying the assist component Ta* based on the reverse input vibration component Tr0' extracted by the extraction processing unit 82 may be applied in combination with the configurations of other modified examples.

According to the present invention, it is possible to propose a new method for using the information acquired from the bearing apparatus.

What is claimed is:

1. A steering control apparatus, comprising a control unit configured to control driving of a motor that is a source of an assist force to be applied to a steering mechanism of a vehicle based on an operation condition amount changed through a driver's operation for the steering mechanism, wherein
the control unit is configured to:
calculate an assist component indicating the assist force to be generated in the motor based on the operation condition amount;
acquire information on a moment load about an axis extending in a vertical direction of a steered wheel of the vehicle from a bearing apparatus that rotatably supports the steered wheel and includes a bearing apparatus sensor configured to detect a force applied to the steered wheel as an input; and compensate for the assist component by using the acquired information on the moment load so as to generate, in the motor, a vibration suppressing force for suppressing a vibration caused in the steering mechanism by the moment load of the steered wheel, the control unit includes a torque command value calculating unit configured to calculate a torque command value that is a target value of a control amount of the motor by compensating for the assist component by using the information on the moment load, the torque command value calculating unit includes:

an assist component calculating unit configured to calculate the assist component using a steering torque detected from a torque sensor as an input; and a compensation component calculating unit configured to calculate a compensation component using the moment load detected from the bearing apparatus including the bearing apparatus sensor as an input, the compensation component being for compensating for the assist component so as to generate the vibration suppressing force in the motor, the compensation component calculating unit includes an extraction processing unit configured to extract a specific frequency component that belongs to a predetermined frequency band serving as a basis for the compensation component from a force component exerted by the moment load on the steering mechanism, the torque sensor and the bearing apparatus including the bearing apparatus sensor are provided separately, and the predetermined frequency band is determined as a frequency band of a reverse input vibration caused in the steering mechanism when a brake of the vehicle is actuated.

2. The steering control apparatus according to claim 1, wherein the compensation component calculating unit further includes a phase adjustment processing unit configured to adjust a shift amount of a phase of the specific frequency component.

3. The steering control apparatus according to claim 1, wherein the compensation component is reflected in the torque command value as a component having an opposite phase to the phase of the specific frequency component.

4. The steering control apparatus according to claim 1, wherein the compensation component calculating unit includes an addition processing unit configured to calculate information obtained by adding pieces of information on right and left steered wheels together as the information on the moment load, each of the right and left steered wheels being the steered wheels of the vehicle, and the compensation component calculating unit is configured to calculate the compensation component by using the information obtained by adding the pieces of information on the right and left steered wheels together.

5. The steering control apparatus according to claim 1, wherein the steering control apparatus is configured to control a motor of an electric power steering system, the motor being configured to apply the assist force to a steering operation shaft configured to turn the steered wheel.

\* \* \* \* \*